(12) United States Patent
Offredi

(10) Patent No.: US 7,494,155 B2
(45) Date of Patent: Feb. 24, 2009

(54) PIPELINE FOR THE TRANSPORTATION OF LIQUEFIED NATURAL GAS

(75) Inventor: Michael Offredi, Paris (FR)

(73) Assignee: ITP, Louveciennes (FR)

( * ) Notice: Subject to any disclaimer, the term of this patent is extended or adjusted under 35 U.S.C. 154(b) by 525 days.

(21) Appl. No.: 10/988,546

(22) Filed: Nov. 16, 2004

(65) Prior Publication Data

US 2005/0121903 A1 Jun. 9, 2005

(30) Foreign Application Priority Data

Nov. 20, 2003 (FR) ................................. 03 13567
Dec. 5, 2003 (FR) ................................. 03 14319

(51) Int. Cl.
*F16L 11/12* (2006.01)

(52) U.S. Cl. ................. 285/47; 285/222.1; 285/123.15; 138/114

(58) Field of Classification Search ................. 285/47, 285/123.15, 123.16, 222.1; 138/148, 149, 138/114

See application file for complete search history.

(56) References Cited

U.S. PATENT DOCUMENTS

| | | | | |
|---|---|---|---|---|
| 534,473 | A | * | 2/1895 | Harvey ........................ 138/148 |
| 2,494,803 | A | * | 1/1950 | Frost, et al. .................. 138/148 |
| 3,397,720 | A | * | 8/1968 | Jones ........................... 138/149 |
| 3,698,440 | A | * | 10/1972 | Matthieu et al. ............. 138/149 |
| 3,988,029 | A | | 10/1976 | Gibson |
| 4,014,369 | A | * | 3/1977 | Kobres, Jr. ................... 138/149 |
| 4,084,842 | A | | 4/1978 | Stonitsch et al. |
| 4,130,301 | A | | 12/1978 | Dunham et al. |
| 4,491,347 | A | | 1/1985 | Gustafson |
| H594 | H | * | 3/1989 | Adorjan ....................... 138/148 |
| 2002/0089177 | A1 | | 7/2002 | Bonn |

FOREIGN PATENT DOCUMENTS

FR     2 748 545     11/1997

* cited by examiner

*Primary Examiner*—Aaron M Dunwoody
(74) *Attorney, Agent, or Firm*—Steptoe & Johnson LLP

(57) ABSTRACT

A thermally-insulated pipeline for the transportation of a cryogenic liquid, comprising three coaxial pipes formed of sections, one inner pipe made of a material having a low thermal expansion coefficient, a middle pipe and an outer pipe made of steel. The pipes are linked by linking parts which join sections of each respective pipe and take up the loads produced by thermal expansion or contraction when the pipes change temperature. The linking parts that join the inner pipe and the middle pipe are separated from the linking parts that join the middle and outer pipe, so that a thermal bridge cannot form between the inner pipe and the outer pipe.

11 Claims, 3 Drawing Sheets

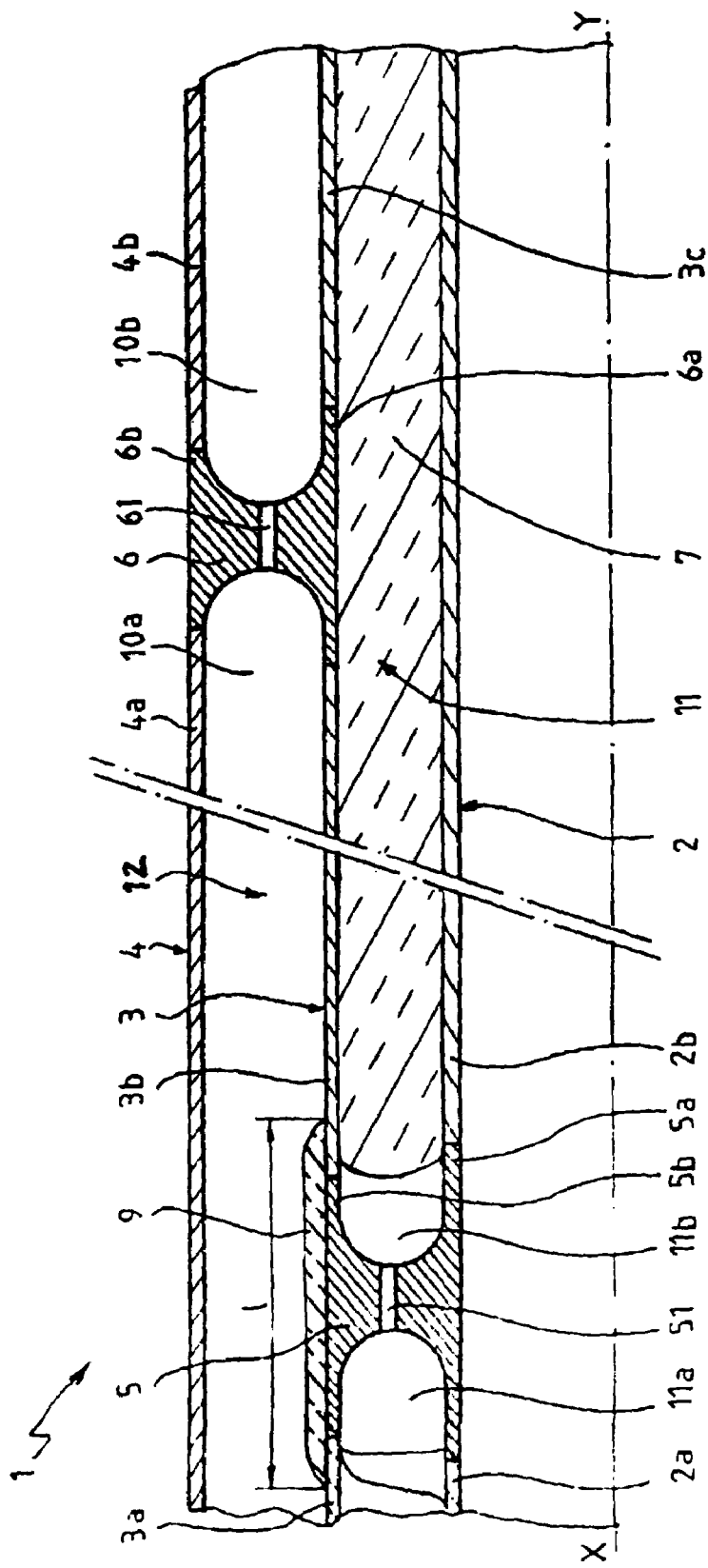

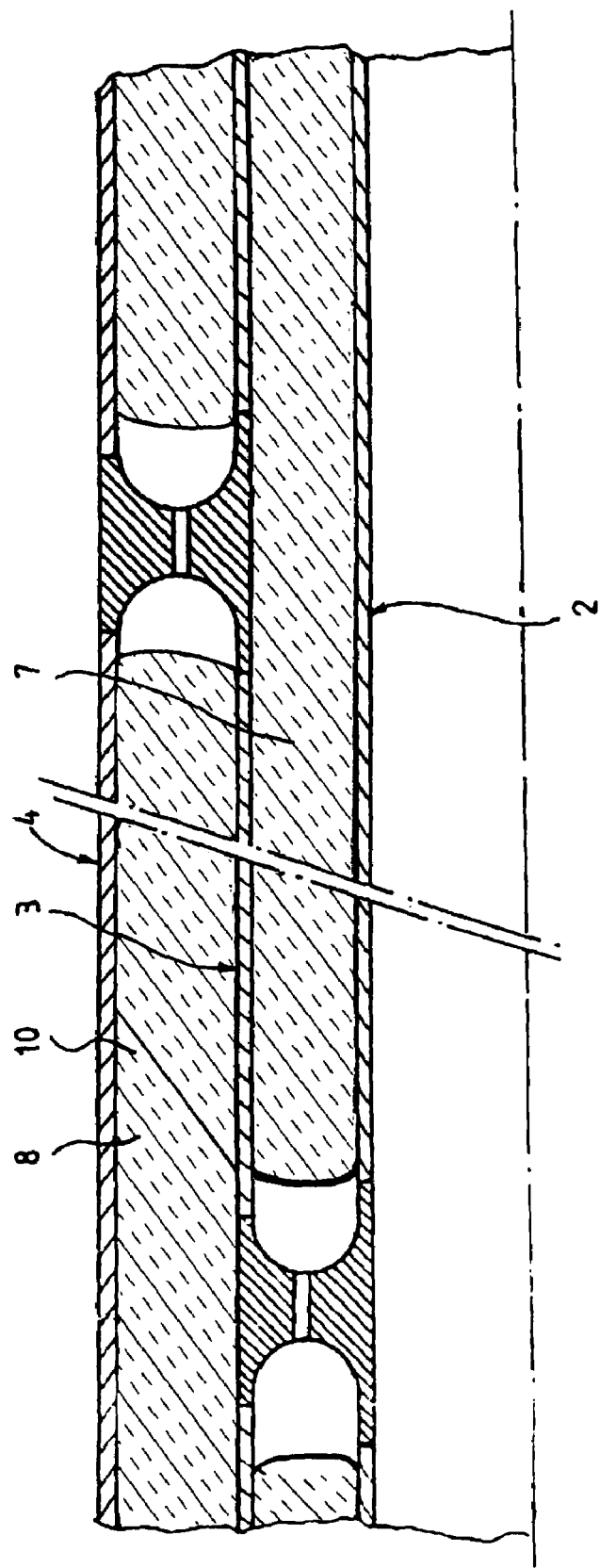

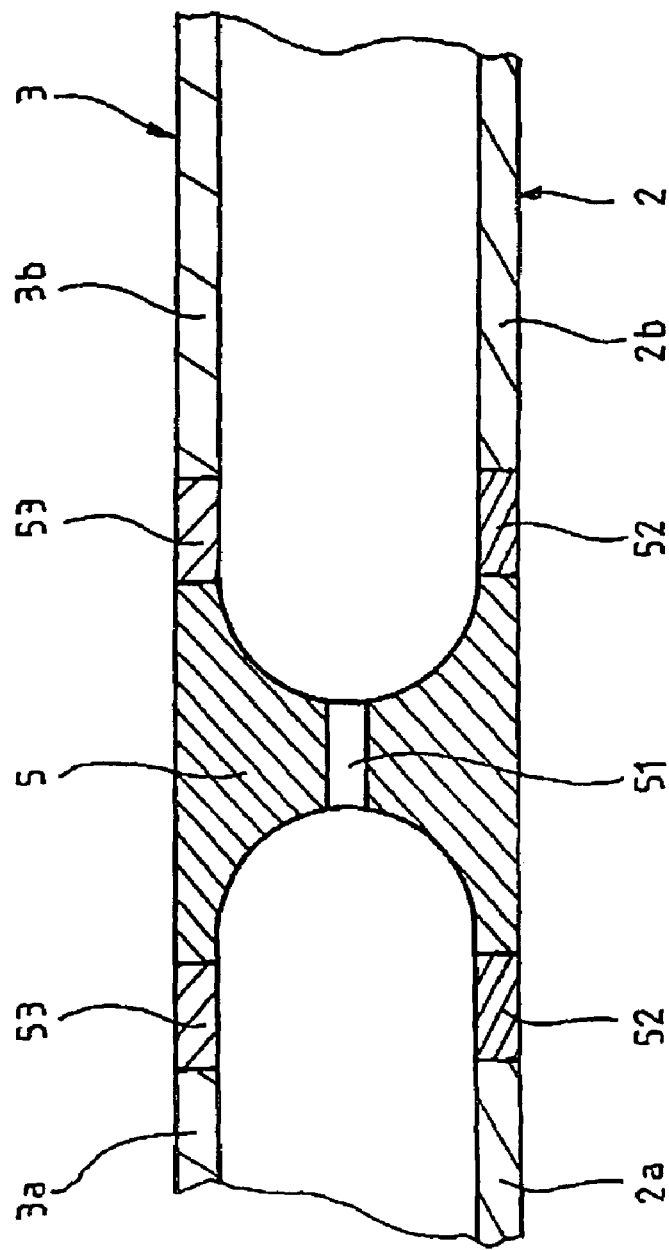

PIPELINE FOR THE TRANSPORTATION OF LIQUEFIED NATURAL GAS

BACKGROUND OF THE INVENTION

1. Field of the Invention

The technical scope of the present invention is that of pipelines for the transportation of very low temperature fluids, and in particular for the transportation of liquefied natural gas under ground, above-ground, or under the sea.

2. Description of the Related Art

Patent FR-2748545 describes a pipeline for the transportation of liquefied natural gas comprising two coaxial pipes. This type of pipeline has thermal insulation properties but also suffers from drawbacks. Indeed, the contraction of the inner pipe (by around 1 m for a pipe of a length of 4,000 m) requires the use of a steel linking part between the two pipes placed before the end of the straight part of the pipeline, such a linking part creating a thermal bridge and resulting in:

a deterioration in the thermal efficiency of the assembly,
a lowering in the temperature of the external pipe, thereby embrittling it and making it sensitive to impacts and concentrations of stress.

Moreover, the use of a simple external wall cannot be considered sufficient in terms of reliability.

SUMMARY OF THE INVENTION

The aim of the present invention is thus to supply a pipeline for the transportation of cryogenic liquids, such as liquefied natural gas, that has efficient thermal insulation, with no thermal bridges at the ends of the pipe sections and which is extremely reliable.

The invention thus relates to a pipeline for the transportation of a cryogenic liquid, thermally insulated and comprising three coaxial pipes formed of sections, one inner pipe made of a material having a low thermal expansion coefficient, a middle pipe and an outer pipe made of steel, the annulus space between the inner pipe and the middle pipe being provided with thermal insulation, wherein:

the said inner pipe and middle pipe, as well as the said middle pipe and outer pipe, are respectively linked together using linking parts so as firstly to join the sections of each respective pipe and secondly to take up the loads produced by thermal contraction when the pipes change temperature, the section of the middle pipe between the linking parts is of a sufficient length such that when assembled, it prevents the formation of a thermal bridge between the inner and outer pipes.

According to one characteristic, the annulus space between the middle pipe and the outer pipe is provided with thermal insulation.

According to another embodiment of the invention, the annulus space between the middle pipe and the outer pipe is filled with a gas that is pressurized or depressurized with respect to the pressure of the surrounding sub-marine environment.

According to yet another characteristic, the linking parts are in the shape of two U's (or another symmetrical shape) joined at their base and incorporating a hole so as to allow the gas to circulate between the different sections of a same annulus and thereby allow said annulus to be pressurized or depressurized.

According to yet another characteristic, the linking parts connecting the inner pipe -and the middle pipe are fastened respectively by tubular spacers having a thermal dilation coefficient situated between the thermal dilation coefficient of the linking part and that of the inner and middle pipes connected to it.

According to another characteristic:
the inner pipe has a wall thickness of less than approximately 8 mm,
the middle pipe has a wall thickness of less than 15 mm and more than 6 mm approximately, and
the outer pipe has a wall thickness of over 12 mm approximately.

According to another characteristic, the inner pipe is made of a material whose dilation coefficient is less than $2.10^{-6}$ m/m/K for temperatures of between $-162°$ C. and $20°$ C.

According to another characteristic, the inner pipe is made of an iron-nickel alloy incorporating a proportion of nickel of around 36%.

According to another characteristic, the middle pipe is made of a material adapted to low temperatures, for example stainless steel or 9% nickel alloyed steel.

According to another characteristic, the thermal insulation is a silica-based insulating material under a controlled vacuum.

A first advantage of the pipeline according to the invention lies in the considerable reduction in the risk of the pipe failure.

Another advantage lies in the fact that the linking part between two coaxial pipes is able to withstand differential thermal contraction.

Yet another advantage lies in the fact that the inspection of the second annulus allows the condition of the pipeline to be verified both reliably and at little cost.

BRIEF DESCRIPTION OF THE DRAWINGS

Other characteristics, particulars and advantages of the invention will become more apparent from the description given hereafter by way of illustration and in reference to the drawings, in which:

FIG. 1 is a longitudinal section of one embodiment of the invention,

FIG. 2 is a longitudinal section of another embodiment, and

FIG. 3 shows an embodiment of the link between two pipes according to the invention.

DETAILED DESCRIPTION OF PREFERRED EMBODIMENTS

Generally speaking, the pipelines in question are used to carry a cryogenic liquid from one point to another, for example to fill or empty a ship of liquefied gas when it is far from the liquefaction plant. The pipelines are thus immersed in the sea and must rise vertically by means of a bend. The variations in length of the part of the pipeline immersed in the sea or on supports leads to variations in the position of the vertical upright part of the pipeline. These variations cause stresses in the vertical part which must be controlled. The same stresses must be controlled when the pipeline is underground or aerial.

FIG. 1 partially shows a pipeline 1, sectioned along the longitudinal axis XY, intended for the transportation of a cryogenic liquid formed of three pipes: an inner pipe 2 inside which the cryogenic fluid circulates, a middle pipe 3 and an outer pipe 4. Each of these pipes is formed of sections 2a and 2b; 3a, 3b and 3c; 4a and 4b which are welded end to end to make the full pipeline. According to the invention, the pipe sections are joined using parts 5 and 6 that take up the load. The purpose of these parts 5 and 6 is to limit, according to one of the essential aspects of the invention, the loads applied to the end of the pipe. This proves particularly important when the pipe has a bend. The bent part of the pipeline is not shown in the drawing, but the expert will easily understand the advantage of reducing the contraction of this pipeline.

The inner pipe 2 is delimited in the Figure by two sections 2a and 2b, the middle pipe 3 by three sections 3a, 3b and 3c and the outer pipe 4 by two sections 4a and 4b.

Sections 2a, 3a and 4a are, for example, the ends of a bend, and sections 2b, 3c and 4b the ends of the undersea pipeline that may be several kilometers long. Other arrangements may naturally also be envisaged, for example by mounting one after another several similar devices such as will be described hereafter.

The sections of the inner pipe 2 and middle pipe 3 are joined by part 5 and the sections of middle pipe 3 and outer pipe 4 by part 6. The linking parts 5 and 6 have a section in the shape of two U's (or another symmetrical shape) joined at their base. Naturally, each pipe section is welded to the corresponding branch of the U, the inner pipes 2 and middle pipes 3 being respectively attached to the inner 5a and outer 5b branches of part 5 and the middle pipe 3 and outer pipe are respectively attached to the inner 6a and outer 6b branches of part 6.

The inner diameter of part 5 is equal to the inner diameter of the inner pipe 2 such that there is a perfect join between these two elements. The outer diameter of part 5 is equal to the outer diameter of the middle pipe 3 such that there is also a perfect join here. The distance between the two branches 5a and 5b of the U is determined according to that desired between the inner pipe 2 and outer pipe 3. This distance will define the thickness of insulation 7 to be incorporated between the two pipes 2 and 3.

The inner diameter of part 6 is equal to the inner diameter of middle pipe 3 such that there is a perfect join between them. The outer diameter of part 6 is equal to the outer diameter of outer pipe 4 such that there is once again a perfect join. The distance between the two branches of the U of part 6 is also determined according to the distance desired between the middle pipe 3 and outer pipe 4.

Part 5 incorporates a hole 51. This hole 51 allows the circulation of air between sections 11a and 11b of the first annulus 11, located between the inner pipe 2 and the middle pipe 3, thereby allowing said annulus 11 to be pressurized or depressurized.

Part 6 also incorporates a hole 61. This hole 61 allows the circulation of air between sections 10a and 10b of the second annulus 10, located between the outer pipe 4 and the middle pipe 3, thereby allowing said annulus 10 to be pressurized or depressurized.

FIG. 1 shows that parts 5 and 6 are not placed one after the other around the diameter. Indeed, according to the invention, the creation of a thermal bridge between inner pipe 2 and outer pipe 4 is prevented. Indeed, a single linking part between the three pipes would cause substantial local gain in calories and a substantial lowering of the temperature of the outer pipe 4 (which may drop to temperatures of under −100° C.). Since the outer pipe is made of carbon steel for financial reasons, its temperature cannot drop to under around −500° C. if good ductility is to be preserved. The invention proposes a solution that is particularly advantageous in that it is unnecessary for a single linking part to be insulated which, on the inner side, would be subjected to cryogenic temperatures and, on the outer side, to the marine environment. Additionally, this part must absorb the shearing stresses linked to the displacements of the pipeline under the effect of the thermal contractions, thereby further complicating the solution.

Thus, the production of a three-pipe pipeline incorporating a separate linking part to join the pipes two by two enables localized thermal problems to be overcome. Lastly, the introduction of a third pipe helps to stiffen the pipeline, thereby significantly improving its reliability. It is easy to accept that the probability of the simultaneous failure of the middle and outer pipes is almost inexistent. The second annulus 10 allows the condition of the pipeline to be monitored by depressurizing or pressurizing it.

Insulation 7 is placed between the inner pipes 2 and middle pipes 3. Annulus 10, located between the middle 3 and outer 4 pipes, is filled, in this embodiment, with a gas that can be pressurized with respect to the undersea pressure. This gas is, for example, nitrogen. The use of a pressurized gas namely allows any leakage of the outer pipe to be detected. The continuous monitoring of this pressure enables the simple and inexpensive monitoring of the condition of the pipeline.

So as to limit the thermal losses from the linking part 5 it is also possible for insulation 9 to be placed around the part 5 and the middle pipe 3. For example, a sleeve of a length 1 of 0.5 to 1.5 m approximately is largely sufficient to ensure this insulation.

A variant embodiment of the invention, shown in FIG. 2, consists in placing insulation 8 in the annulus 10 located between the middle pipe 3 and outer pipe 4. This arrangement does not prevent the introduction of a pressurized or depressurized gas as explained above.

Insulations 7, 8 and 9 are, for example, silica-based or microporous under controlled industrial vacuum either individually packed or along the length of the annulus.

So as to reduce the circumferential stresses in the welds, due to the thermal contractions and dilations, it may be advantageous for the linking parts 5 to have a thermal dilation coefficient of between the thermal dilation coefficient of the linking part 5 and that of the inner 2 and middle 3 pipes connected to it. It may be difficult to obtain such parts. FIG. 3 thus shows an embodiment enabling the performances of the pipeline to be improved. In this embodiment, the linking parts 5 connecting the inner pipe 2 to the middle pipe 3 are fastened to pipes 2 and 3 respectively by tubular spacers 52 and 53 having a thermal dilation coefficient of between the thermal dilation coefficient of the linking parts 5 and that of the inner 2 and middle 3 pipes connected to it. Spacer 53, of outer and inner diameters respectively identical to the outer and inner diameters of pipe 3, is placed between part 5 and sections 3a and 3b of pipe 3. Spacer 52 of outer and inner diameters respectively identical to the outer and inner diameters of pipe 2, is placed between part 5 and sections 2a and 2b of pipe 2.

Such an arrangement may also be applied to linking part 6. But since the difference in temperature between the middle 3 and outer 4 pipes is less than the temperature difference between the middle 3 and inner 2 pipes, such an arrangement is not strictly speaking required.

By way of a non-exhaustive example, the inner pipe 2 has a wall thickness of less than approximately 8 mm, the middle pipe 3 has a wall thickness of between approximately 6 and 15 mm, and the outer pipe 4 has a wall thickness of over approximately 12 mm.

The inner pipe is advantageously made of an iron/Nickel alloy, with a Nickel component of around 36%, of which the dilation coefficient is less than $2.10^{-6}$ m/m/K for temperatures of between −162° C. and 200° C. The middle pipe 3 is made of a material adapted to low temperatures, for example a stainless steel or 9% nickel alloyed steel and the outer pipe 4 of ordinary steel.

What is claimed is:

1. A pipeline for the transportation of a cryogenic liquid comprising:
- a first, inner pipe made of a material having a low thermal expansion coefficient and comprising a plurality of sections,
- a second, middle pipe made of steel and comprising a plurality of sections,
- a plurality of first linking parts, for receiving ends of the sections of said first pipe and said second pipe, and for linking sections of said first pipe to sections of said second pipe, and for supporting loads substantially due to differential thermal expansion or contraction between said first and second pipes,
- thermal insulation in an elongate annular space between said first and second pipes,
- a third, outer pipe made of steel and comprising a plurality of sections, and
- a plurality of second linking parts, for receiving ends of sections of said second pipe and said third pipe, and for linking sections of said second pipe to sections of said third pipe, and for supporting loads substantially due to differential thermal expansion or contraction between said second and third pipes,
- said second and third pipes and said second linking parts forming an elongate annular space between sections of said second pipe and said third pipe, wherein the length of the sections of said second pipe are such that, when assembled, in cooperation with said linking parts, they prevent said first and second linking parts from contacting one another, thereby preventing the formation of a thermal bridge between said first and third pipes.

2. A pipeline for the transportation of a liquefied natural gas according to claim 1, wherein the elongate annular space between said middle pipe and said outer pipe is provided with thermal insulation.

3. A pipeline for the transportation of a liquefied natural gas according to claim 1, wherein the elongate annular space between said middle pipe and said outer pipe is filled with a gas that is pressurized or depressurized with respect to the pressure of the environment outside the outer pipe of said pipeline.

4. A pipeline for the transportation of a liquefied natural gas according to claim 1, wherein said linking parts are in the shape of two U's joined at their base and incorporating a hole at the joined axis of the U's, parallel to the axis of said pipes, thereby permitting gas to circulate between different sections of an annular space, and thereby permitting said annular space to be pressurized or depressurized.

5. A pipeline for the transportation of a liquefied natural gas according to claim 1, wherein said first linking parts connecting said inner pipe and said middle pipe are fastened respectively by tubular spacers having a thermal expansion coefficient between the thermal expansion coefficient of said linking part and that of said inner and middle pipes.

6. A pipeline for the transportation of a liquefied natural gas according to claim 1, wherein: said inner pipe has a wall thickness of less than approximately 8 mm, said middle pipe has a wall thickness of less than 15 mm and more than 6 mm approximately, and said outer pipe has a wall thickness of over 12 mm approximately.

7. A pipeline for the transportation of a liquefied natural gas according to claim 1, wherein said inner pipe is made of a material whose expansion coefficient is less than $2.10^{-6}$ m/m/K for temperatures of between $-162°$ C. and $20°$ C.

8. A pipeline for the transportation of a liquefied natural gas according to claim 1, wherein said inner pipe is made of an iron-nickel alloy incorporating a proportion of nickel of around 36%.

9. A pipeline for the transportation of a liquefied natural gas according to claim 1, wherein said middle pipe is made of a material adapted to low temperatures.

10. A pipeline for the transportation of a liquefied natural gas according to claim 1, wherein said thermal insulation is a silica-based insulating material under a controlled vacuum.

11. A pipeline for the transportation of a liquefied natural gas according to claim 9, wherein said middle pipe material is either stainless steel or 9% nickel alloyed steel.

* * * * *